United States Patent
Jang

(10) Patent No.: US 11,136,471 B2
(45) Date of Patent: Oct. 5, 2021

(54) UV CURABLE COATING COMPOSITION

(71) Applicant: EVERGREEN C&T Corporation, Cheongju-si (KR)

(72) Inventor: Dae Il Jang, Seoul (KR)

(73) Assignee: EVERGREEN C&T Corporation, Cheongju-si (KR)

(*) Notice: Subject to any disclaimer, the term of this patent is extended or adjusted under 35 U.S.C. 154(b) by 410 days.

(21) Appl. No.: 15/712,949

(22) Filed: Sep. 22, 2017

(65) Prior Publication Data

US 2019/0092964 A1 Mar. 28, 2019

(51) Int. Cl.
| | |
|---|---|
| *C09D 163/00* | (2006.01) |
| *C08K 5/5435* | (2006.01) |
| *C08K 5/053* | (2006.01) |
| *G02B 1/04* | (2006.01) |
| *C08G 59/04* | (2006.01) |
| *C08G 59/32* | (2006.01) |
| *C08K 5/372* | (2006.01) |
| *C08K 5/02* | (2006.01) |

(52) U.S. Cl.
CPC ........... *C09D 163/00* (2013.01); *C08G 59/04* (2013.01); *C08G 59/32* (2013.01); *C08K 5/053* (2013.01); *C08K 5/5435* (2013.01); *G02B 1/041* (2013.01); *C08K 5/02* (2013.01); *C08K 5/372* (2013.01); *C08L 2205/05* (2013.01)

(58) Field of Classification Search
CPC ...... C09D 163/00; C08G 59/40; G02B 1/041; C08K 5/053; C08K 5/5435; C08K 5/02; C08K 5/372

See application file for complete search history.

(56) References Cited

U.S. PATENT DOCUMENTS

| | | | |
|---|---|---|---|
| 6,750,290 B2 * | 6/2004 | Imamura | B41J 2/1606 346/105 |
| 6,780,232 B2 | 8/2004 | Treadway | |
| 2005/0256219 A1 * | 11/2005 | Takase | C08G 18/48 522/7 |
| 2012/0315486 A1 | 12/2012 | Treadway | |
| 2013/0274366 A1 | 10/2013 | Jin | |
| 2014/0342100 A1 | 11/2014 | Valeri | |
| 2017/0045646 A1 * | 2/2017 | Sato | B32B 27/20 |

OTHER PUBLICATIONS

Nagase, "DENACOL Aliphatic Epoxies", Product information (No Date).*

* cited by examiner

*Primary Examiner* — Jessica M Roswell

(74) *Attorney, Agent, or Firm* — Novick, Kim & Lee, PLLC; Jae Youn Kim

(57) ABSTRACT

Provided is a UV curable coating composition, and more particularly, to a UV curable coating composition including: at least one polyfunctional epoxy oligomer; at least one epoxy compound; at least one non-hydrolyzed epoxy silane; at least one polyfunctional acrylic compound; at least two photoinitiators; and at least one surfactant. The UV curable coating composition according to the present invention can be coated on various substrates and provide excellent adhesion and scratch resistance to the coating layer regardless of a substrate type unlike conventional coating compositions.

13 Claims, No Drawings

UV CURABLE COATING COMPOSITION

TECHNICAL FIELD

The present invention relates to a UV curable coating composition, and more particularly, to a UV curable coating composition including: at least one polyfunctional epoxy oligomer; at least one epoxy compound; at least one non-hydrolyzed epoxy silane; at least one polyfunctional acrylic compound; at least two photoinitiators; and at least one surfactant.

BACKGROUND ART

Transparent optical plastic lenses are lighter than glass lenses and have a low risk of breaking, and thus are very usefully used. However, since the plastics are less scratch resistant than glass, a hard coating process is required. In the case of the optical plastic lenses, especially lenses for spectacles, a method of curing and hard-coating a polysiloxane-based hard coating liquid by a thermosetting method is generally adopted.

However, the method is suitable mass production by generating a hard coating layer of the plastic lenses at a high temperature for 2 to 3 hours, but is not suitable by temporal/spatial restrictions in the case of coating by an order production method. As a result, a method of exhibiting the same properties in a short time has been sought, and a UV curable hard coating has been an answer.

In the case of a polysiloxane-based composition which is a thermosetting type general hard coating composition, the polysiloxane-based composition is coated on CR-39 and urethane-based substrates to be excellent in adhesion and abrasion resistance, but it is disadvantageous in that adhesion to the polycarbonate (PC) and acrylic substrates is significantly deteriorated and thus, it is general to use a primer. However, such a double coating method causes inconveniences in production and an increase in production costs. In the case of a UV curable hard coating composition, development of a coating liquid which embodies adhesion and abrasion resistance suitable for all plastic lens substrates (CR-39, urethane, acrylic, and polycarbonate) is still difficult.

As a prior art, US 2013/0274366 discloses a composition including polysiloxane and a polyfunctional acrylic compound and a UV curable hard coat layer coated with the composition thereof. However, the coating composition disclosed in the prior art provides adequate adhesion and scratch resistance to substrates made of polycarbonate, such as goggles, face shields, and face plates for helmets, which are used as protective equipment. However, there is a problem in that the coating composition does not provide adequate adhesion to the CR-39 or urethane based substrate, which is often used for spectacle lenses.

As another prior art, U.S. Pat. No. 6,780,232 discloses a UV curable coating composition including an appropriate amount of hydrolyzed silane in a coating composition including polysiloxane which is generally used as a thermosetting hard coating composition. However, when the coating composition is coated on a polycarbonate substrate, there is a problem that the adhesion is reduced and scratch resistance at a target level is not secured.

As yet another prior art, US 2012/0315486 discloses a coating composition having excellent scratch resistance, and in the case of the coating composition disclosed in the prior art, colloidal silica is applied to the composition to improve scratch resistance. However, as a result, the scratch resistance may be improved, but a haze problem and an adhesion problem in the polycarbonate-based substrate have not been overcome.

As still another prior art, US 2014/0342100 discloses a UV curable composition having excellent adhesion to various spectacle lens substrates including non-hydrolyzed silane while including both a polyfunctional epoxy compound and a polyfunctional acrylic compound. However, the coating composition in the prior art has an advantage of securing the applicable adhesion to various types of substrates, but does not achieve the scratch resistance at a target level.

DISCLOSURE

Technical Problem

The present invention has been made in an effort to provide a UV curable coating composition with excellent adhesion and scratch resistance while may be coated on various substrates.

Technical Solution

An exemplary embodiment of the present invention provides a UV curable coating composition including: at least one polyfunctional epoxy oligomer; at least one epoxy compound; at least one non-hydrolyzed epoxy silane; at least one polyfunctional acrylic compound; at least two photoinitiators; and at least one surfactant.

Advantageous Effects

According to the exemplary embodiment of the present invention, the UV curable coating composition may be coated on various substrates such as urethane-based, polycarbonate (PC)-based, and acryl-based substrates and provides excellent adhesion and scratch resistance to the coating layer regardless of a kind of substrate unlike conventional coating compositions.

MODES OF THE INVENTION

Unless otherwise defined, all technical and scientific terms used in this specification have the same meaning as those commonly understood by those skilled in the art. In general, the nomenclature used in this specification is well-known and commonly used in the art.

An aspect of the present invention provides a UV curable coating composition including: at least one polyfunctional epoxy oligomer; at least one epoxy compound; at least one non-hydrolyzed epoxy silane; at least one polyfunctional acrylic compound; at least two photoinitiators; and at least one surfactant.

More particularly, the coating composition according to the present invention is a UV curable coating composition including: at least one polyfunctional epoxy oligomer oligomerized in the presence of at least one base; at least one epoxy compound; at least one non-hydrolyzed epoxy silane; at least one polyfunctional acrylic compound; at least one radical photoinitiator; at least one cationic photoinitiator; and at least one surfactant.

In the coating composition according to the present invention, the oligomerized polyfunctional epoxy oligomers synthesized in the presence of bases are used, and it can be confirmed that the adhesion and scratch resistance of the coating layer are improved when the polyfunctional epoxy oligomers are coated on various substrates.

In the case of UV curable hard coating, generally, a spin-coating method is used, but in the case of coating using the spin-coating method, when the coating composition including the non-hydrolyzed epoxy silane is used, the viscosity of the coating composition is lowered and a nonuniformity problem of the coating layer is caused. In order to overcome the problem, when a polyfunctional acrylic compound having high viscosity is used, the nonuniformity problem of the coating layer may be solved, but in the substrate for spectacle lenses, there is a problem that haze occurs in the lenses. The uniformity of the coating layer may be ensured due to an increase in viscosity while decreasing the haze by using a commercially available epoxy silane having high viscosity, but in this case, there is a problem that adhesion to various substrates is impossible.

Even while the UV curable coating composition according to the present invention maintains excellent scratch resistance of the coating layer, the coating layer may be adhered to various substrates. In addition, in order to solve the haze and the nonuniformity problem of the coating layer, a cationic photoinitiator and a free radical photoinitiator are simultaneously used, and the viscosity of the epoxy oligomer included in the composition is 10,000 to 40,000 cps, more particularly 20,000 to 40,000 cps at 25° C.

In the UV curable coating composition according to the present invention, the content of at least one polyfunctional epoxy oligomer is 20 to 45 wt % and particularly 25 to 40 wt % with respect to the total weight of the UV curable coating composition, the content of at least one epoxy compound is 5 to 25 wt % and particularly 10 to 25 wt % with respect to the total weight of the UV curable coating composition, the content of at least one non-hydrolyzed epoxy silane is 10 to 50 wt % and particularly 20 to 30 wt % with respect to the total weight of the UV curable coating composition, and the content of at least one polyfunctional acrylic compound is 1 to 30 wt % and particularly 10 to 20 wt % with respect to the total weight of the UV curable coating composition. In addition, the content of at least two photoinitiators is 0.1 to 15 wt % and particularly 0.1 to 10 wt % with respect to the total weight of the UV curable coating composition, and the content of at least one surfactant is 0.01 to 10 wt % and particularly 0.1 to 5 wt % with respect to the total weight of the UV curable coating composition.

In the UV curable coating composition according to the present invention, the at least one polyfunctional epoxy oligomer is prepared by mixing at least one polyhydric alcohol and epichlorohydrin to form chlorohydrin ether and then performing dehydration condensation. The at least one polyhydric alcohol are preferably polyhydric alcohol having at least one structure of Chemical Formulas 1 to 3 below, particularly trihydric or higher alcohols, and more particularly at least one alcohol selected from the group consisting of glycerin, diglycerin, polyglycerin, trimethylolpropane, sorbitol and pentaerythritol.

[Chemical Formula 1]

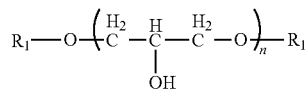

[Chemical Formula 2]

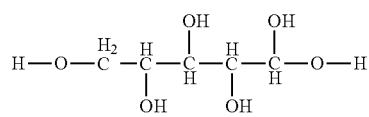

[Chemical Formula 3]

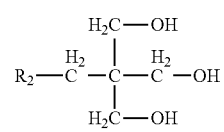

In Chemical Formulas 1 to 3 above,
$R_1$ is $C_3$-$C_8$ alkyl substituted with at least one hydroxyl,
$R_2$ is hydroxyl or $C_1$-$C_5$ alkyl, and
n is an integer of 1 to 4.

At least one polyfunctional epoxy oligomer prepared by a dehydration condensation reaction after mixing at least one polyhydric alcohol with epichlorohydrin to form chlorohydrin ether may be prepared under a catalyst, and nonlimiting examples of these catalysts include $BF_3$, $BF_3.Et_2O$, $BF_3.H_2O$, $SnCl_2.H_2O$, $Sn(BF_4)_2$, $Fe(BF_4)_2$, $Ca(BF_4)_2$, $Zn(BF_4)_2$, $Mg(BF_4)_2$, $Cu(BF_4)_2$, $NH_4(BF_4)_2$, and the like. Further, the content of the epichlorohydrin is 0.5 to 8 mol and particularly 1 to 4 mol, based on 1 mol of polyhydric alcohol. The production reaction temperature of the at least one polyfunctional epoxy oligomer is 80 to 180° C. and particularly 120 to 160° C., and the reaction time is 1 to 24 hours and particularly 4 to 10 hours.

In the dehydration condensation process, at least one of sodium carbonate, potassium carbonate, sodium hydroxide, potassium hydroxide, calcium hydroxide, and mixtures thereof may be used strong alkali and particularly, sodium hydroxide is preferable. The content of the strong alkali used is preferably 0.8 to 1.3 mol based on 1 mol of epichlorohydrin.

The polyfunctional epoxy oligomer obtained by a series of reactions above has at least two epoxy groups and at least one hydroxy group, and the viscosity thereof is 10,000 to 40,000 cps at 25° C. and more particularly 20,000 to 30,000 cps and a molecular weight is about 200 to 20,000.

In the UV curable coating composition according to the present invention, at least one unhydrolyzed epoxy silane has a structure represented by Chemical Formula 4 below.

[Chemical Formula 4]

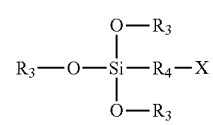

In Chemical Formula 4,
$R_3$ is $C_1$-$C_5$ alkyl,
$R_4$ is $C_1$-$C_5$ alkylene or $C_1$-$C_5$ alkyleneoxy, and
X is $C_2$-$C_8$ alkylene oxide or $C_3$-$C_8$ cycloalkylene oxide.

In the UV curable coating composition according to the present invention, the at least one polyfunctional acrylic compound is at least one compound selected from the group consisting of 1,4-butanediol diacrylate, 1,6-hexanediol diacrylate, pentaerythritol triacrylate, dipentaerythritol hexaacrylate, and trimethylolpropane triacryate.

In the UV curable coating composition according to the present invention, at least two photoinitiators include at least one cationic photoinitiator and at least one free radical photoinitiator, respectively, the cationic photoinitiator may be at least one photoinitiator selected from the group consisting of triarylsulfonium salts and diaryliodonium salts, and the free radical photoinitiator may be at least one free radical photoinitiator selected from the group consisting of chloromethylbenzophenone, ethyl benzoin ether, isopropyl benzoin ether, diethoxy acetophenone, α,α-dimethoxy-α-phenylacetophenone, (1-(4-(4-hydroxyethoxy)-phenyl-2-hydroxy-2-methyl-1-propane-1-one, 1-hydroxy-cyclohexyl phenyl ketone, and 2-hydroxy-2-methyl-1-phenyl-propan-1-one.

Another aspect of the present invention provides a substrate coated with the UV curable coating composition, in which a material of the substrate may be selected from the group consisting of polythiol urethane, polyacryl, polyamide, polyimide, polysulfone, polycarbonate, a polycarbonate-poly(ethylene terephthalate) copolymer, and polyaryl carbonate.

Yet another aspect of the present invention is lenses coated with the UV curable coating composition, in which a coating method may be dip, spin, bar, spray coating, and preferably, spin-coating is applied. The thickness of the coating layer is 1 to 20 μm and particularly 2 to 10 μm.

Hereinafter, the present invention will be described in more detail through Examples. These Examples are just to exemplify the present invention, and it is apparent to those skilled in the art that it is interpreted that the scope of the present invention is not limited to these Examples.

EXAMPLE 1

Preparation of Polyfunctional Epoxy Oligomer

1) Oligomer A
182 g of sorbitol and 555 g of epichlorohydrin were placed in a 2 L four-necked flask equipped with a decompression reflux device, and the temperature was increased to 50° C. 500 ppm of $SnCl_2 \cdot H_2O$ was added thereto, and the temperature was increased to about 150° C., and the reaction was performed while stirring for 6 hours. After 491 g of methyl isobutyl ketone was added to the mixture which was reacted, 300 g of a 50% sodium hydroxide aqueous solution was added, and then while the mixture was slowly dropped at 70° C., the dehydration condensation reaction was performed by reducing the pressure.

After the reaction was completed, distilled water and methyl isobutyl methane were added to separate an aqueous layer and an organic layer, and only the organic layer was separated, the water was removed with $MgSO_4$, methyl isobutyl ketone as an organic solvent was removed under reduced pressure to obtain oligomer A (1.29 (25° C.) of specific gravity, 26,000 cps (25° C.) of viscosity, and 92% of yield).

2) Oligomer B
Except for using 150 g of trimethylol propane instead of sorbitol, oligomer B (1.27 (25° C.) of specific gravity, 23,000 cps (25° C.) of viscosity, and 94% of yield) was obtained in the same manner as oligomer A.

EXAMPLE 2

Preparation of UV Curable Resin Composition

In order to prepare the UV curable coating compositions in Experimental Examples 1 to 9 and Comparative Examples 1 to 3, components and contents of the composition in Examples and Comparative Examples were prepared as illustrated in Table 1.

The acrylic compound, the epoxy oligomer, the epoxy silane and the epoxy compound were added into a 3-necked flask at once and fully mixed for 6 hours at room temperature, and then a photoinitiator and a surfactant were added thereto, and then mixed for about 2 hours by blocking all light sources. When the mixing was completed, the mixture was filtered using a 1 micro filter in a space where the light source was blocked to obtain a coating composition.

TABLE 1

Component and contents of coating compositions in Experimental Examples 1 to 9 and Comparative Examples 1 to 3

| No Component | | Experimental Example 1 | Experimental Example 2 | Experimental Example 3 | Experimental Example 4 | Experimental Example 5 | Experimental Example 6 |
|---|---|---|---|---|---|---|---|
| Epoxy oligomer | Oligomer A | 33.21 | 35 | 37.32 | 12.21 | | |
| | Oligomer B | | | | 23.52 | 38.41 | 38.28 |
| Epoxy compound | Trimethylol propane triglycidyl ether | 16.49 | 12.8 | 12.88 | 14.27 | 13.79 | 11.72 |
| | Sorbitol aliphatic polyglycidyl ether | | | | | | |
| Epoxy silane | 2-(3,4-epoxy-cyclohexyl) ethyltrimethoxy silane | | 3.3 | | | | |
| | 3-glycidoxy-propylmethyl-dimethoxy silane | | | | 24.52 | | |
| | 3-glycidoxypropyl trimethoxy silane | 28 | 24.7 | | 28 | 25 | 28 |

TABLE 1-continued

Component and contents of coating compositions in Experimental Examples 1 to 9 and Comparative Examples 1 to 3

| | | Experimental Example 1 | Experimental Example 2 | Experimental Example 3 | Experimental Example 4 | Experimental Example 5 | Experimental Example 6 |
|---|---|---|---|---|---|---|---|
| | 3-glycidoxypropyl trimethoxy silane | | | | 3.28 | | |
| | 2-(3,4-epoxy-cyclohexyl)ethyltrimethoxy silane | | | | | | |
| Acrylic compound | 1,4-butanediol diacrylate | 17.5 | | | | | 17.8 |
| | 1,6-hexanediol diacrylate | | 17.8 | 17.8 | 17.8 | 17.8 | |
| | Pentaerythritol triacrylate | | 2.2 | | | | |
| | Dipentaerythritol tetraacrylate | | | | | | |
| photoinitiator | Triarylsulfonium hexafluoro-antimonate salt | 3.2 | 3.2 | 3.2 | 3.2 | 3.2 | 3.2 |
| | Triarylsulfonium hexafluoro phosphate salt | 0.6 | | | | 0.8 | |
| | 2-hydroxy-2-metal-1-phenyl-propan-1-one | 1 | 1 | 1 | 1 | 1 | 1 |
| surfactant | Polysiloxane-based surfactant | 0.4 | 0.4 | 0.4 | 0.4 | 0.4 | 0.4 |
| Total amount | | 100 | 100 | 100 | 100 | 100 | 100 |
| Viscosity of composition (25° C., cps) | | 82 | 67 | 65 | 72 | 58 | 56 |

| No Component | | Experimental Example 7 | Experimental Example 8 | Experimental Example 9 | Comparative Example 1 | Comparative Example 2 | Comparative Example 3 |
|---|---|---|---|---|---|---|---|
| Epoxy oligomer | Oligomer A | | | | | | |
| | Oligomer B | 28.11 | 38.11 | 28.43 | | | |
| Epoxy compound | Trimethylol propane triglycidyl ether | 5.31 | 8.07 | 17.58 | 51 | | 51 |
| | Sorbitol aliphatic polyglycidyl ether | 17.58 | 4.52 | 1.48 | | 48 | |
| Epoxy silane | 2-(3,4-epoxy-cyclohexyl)ethyltrimethoxy silane | | | | | | |
| | 3-glycidoxy-propylmethyl-dimethoxy silane | | | | | | |
| | 3-glycidoxypropyl trimethoxy silane | 27 | 25 | 25 | 25 | 28 | 25 |
| | 3-glycidoxypropyl trimethoxy silane | | | | | | |
| | 2-(3,4-epoxy-cyclohexyl)ethyltrimethoxy silane | | | 3.21 | | | |
| Acrylic compound | 1,4-butanediol diacrylate | | | | | | 19.5 |
| | 1,6-hexanediol diacrylate | | 17.8 | 17.8 | 19.5 | 19.5 | |
| | Pentaerythritol triacrylate | | | | | | |
| | Dipentaerythritol tetraacrylate | | 2.2 | 2.2 | | | |
| photoinitiator | Triarylsulfonium hexafluoro-antimonate salt | 3.2 | 3.3 | 3.3 | 3.5 | 3.5 | 3.5 |
| | Triarylsulfonium hexafluoro phosphate salt | | | | | | |

TABLE 1-continued

Component and contents of coating compositions in Experimental Examples 1 to 9 and Comparative Examples 1 to 3

| | | | | | | | |
|---|---|---|---|---|---|---|---|
| surfactant | 2-hydroxy-2-metal-1-phenyl-propan-1-one | 1 | 1 | 1 | 1 | 1 | 1 |
| | Polysiloxane-based surfactant | 0.4 | 0.4 | 0.4 | 0.4 | 0.4 | 0.4 |
| Total amount | | 100 | 100 | 100 | 100 | 100 | 100 |
| Viscosity of composition (25° C., cps) | | 61 | 58 | 52 | 25 | 28 | 28 |

EXAMPLE 3

Coating Substrate

The compositions of Table 1 were coated on CR-39, MR-8, polycarbonate substrates using a MIDAS spin coater and photocured through a UV curing machine manufactured by FOURSLAMP.

Specifically, all the substrates before coating were washed with isopropyl alcohol (IPA) and DI-water (distiller water), and then the water was completely removed so that there was no water. The washed substrate was placed on a spin coater center chuck and coated by increasing a speed of 500 to 1000 rpm while applying the liquid. The coated substrate was then exposed to a UV curing machine having a UV power of 1 $J/m^2$ for about 40 seconds to cure the coating film. The environment in which the coating proceeded was maintained at room temperature of 25° C. and humidity of 50% or less.

Table 2 shows physical properties of the respective coating layers formed by coating the UV-curable coating compositions in Experimental Examples 1 to 9 and Comparative Examples 1 to 3 on the CR-39, MR-8 and polycarbonate substrates by the method.

TABLE 2

Physical properties of respective coating layers, when coating UV-curable coating compositions in Experimental Examples 1 to 9 and Comparative Examples 1

| | | | | Adhesion (3) | | |
|---|---|---|---|---|---|---|
| No. | Substrate | Transmittance (1) | Scratch resistance (2) | Before UV weather resistance test (QUV) | After UV weather resistance test (QUV) (4) | Tintability (5) |
| Experimental Example 1 | CR-39 | 95 | B | 5B | 3B | 45 |
| | MR-8 | 95 | B | 5B | 1B | 67 |
| | PC | 93 | B | 5B | 5B | 73 |
| Experimental Example 2 | CR-39 | 97 | B | 5B | 5B | 47 |
| | MR-8 | 97 | B | 5B | 5B | 53 |
| | PC | 96 | C | 5B | 5B | 65 |
| Experimental Example 3 | PC | 95 | C | 5B | 5B | 53 |
| Experimental Example 4 | CR-39 | 95 | C | 5B | 3B | 28 |
| | PC | 94 | C | 5B | 5B | 48 |
| Experimental Example 5 | CR-39 | 97 | B | 4B | 0B | 45 |
| | MR-8 | 97 | B | 3B | 0B | 51 |
| | PC | 96 | B | 5B | 5B | 67 |
| Experimental Example 6 | PC | 94 | C | 5B | 5B | 42 |
| Experimental Example 7 | CR-39 | 95 | B | 3B | 0B | 43 |
| | MR-8 | 95 | B | 2B | 0B | 52 |
| | PC | 94 | B | 5B | 5B | 62 |
| Experimental Example 8 | CR-39 | 97 | B | 3B | 0B | 42 |
| | MR-8 | 97 | B | 1B | 0B | 51 |
| | PC | 96 | B | 5B | 5B | 58 |

TABLE 2-continued

Physical properties of respective coating layers, when coating UV-curable coating compositions in Experimental Examples 1 to 9 and Comparative Examples 1

| No. | Substrate | Transmittance (1) | Scratch resistance (2) | Adhesion (3) Before UV weather resistance test (QUV) | Adhesion (3) After UV weather resistance test (QUV) (4) | Tintability (5) |
|---|---|---|---|---|---|---|
| Experimental Example 9 | PC | 96 | B | 5B | 5B | 58 |
| Comparative Example 1 | CR-39 | 93 | C | 5B | 5B | 15 |
|  | MR-8 | 92 | C | 5B | 5B | 28 |
|  | PC | 87 | D | 5B | 0B | 40 |
| Comparative Example 2 | CR-39 | 92 | E | 5B | 5B | 8 |
|  | MR-8 | 90 | E | 5B | 5B | 17 |
|  | PC | 85 | E | 5B | 0B | 35 |
| Comparative Example 3 | CR-39 | 92 | D | 5B | 5B | 12 |
|  | MR-8 | 92 | D | 5B | 5B | 21 |
|  | PC | 87 | D | 5B | 0B | 42 |

(1) Transmittance: 550 nm transmittance-using ASC model 350
(2) Scratch resistance:-Observed using Olympus BX53M microscope after #0000 steel wool 1 kg load 10 stroks
A (None), B (1 or 2 scratches), C (less than 5 scratches), D (multiple scratches), E (substrate scratch)
(3) Adhesion: Crosshatch test (ASTM D3359, Nichiban CR-24 tape 5 times)-observed using Olympus BX53M microscope
5B (0%), 4B (less than 5%), 3B (5 to 15%), 2B (15 to 35%), 1B (35 to 65%), 0B (more than 65%)
(4) Verification of adhesion using crosshatch test after UV weather resistance test (QUV test) (Nichiban CR-24 tape 5 times)-observed using Olympus BX53M microscope
QUV conditions:
(i) 8-hour UV power setting (340 nm/0.7 w/m$^2$ · nm), 60° C.
(ii) Bubble spraying (condensation) at 50° C. for 4 hours
(iii) Repeat processes (i) and (ii) once more: Total 24 hours
(5) Tintability: Transmittance was measured at 550 nm after immersing BPI black dye at 95° C. for 10 minutes Although the specific part of the present disclosure has been described in detail, it is obvious to those skilled in the art that such a specific description is just a preferred embodiment and the scope of the present disclosure is not limited. Therefore, the substantial scope of the present invention will be defined by the appended claims and equivalents thereof.

The invention claimed is:

1. A UV curable coating composition, comprising:
   at least one polyfunctional epoxy oligomer;
   at least one epoxy compound;
   at least one non-hydrolyzed epoxy silane;
   at least one polyfunctional acrylic compound;
   at least two photoinitiators; and
   at least one surfactant,
   wherein the viscosity of the at least one polyfunctional epoxy oligomer is 23,000 to 40,000 cps at 25° C., and
   wherein the at least one polyfunctional epoxy oligomer is prepared through dehydration condensation after mixing at least one polyhydric alcohol and epichlorohydrin to form chlorohydrin ether.

2. The UV curable coating composition of claim 1, wherein the content of the at least one polyfunctional epoxy oligomer is 20 to 45 wt % with respect to the total weight of the UV curable coating composition, the content of the at least one epoxy compound is 5 to 25 wt % with respect to the total weight of the UV curable coating composition, the content of the at least one non-hydrolyzed epoxy silane is 10 to 50 wt % with respect to the total weight of the UV curable coating composition, the content of the at least one polyfunctional acrylic compound is 1 to 30 wt % with respect to the total weight of the UV curable coating composition, the content of the at least two photoinitiators is 0.1 to 15 wt % with respect to the total weight of the UV curable coating composition, and the content of the at least one surfactant is 0.01 to 10 wt % with respect to the total weight of the UV curable coating composition.

3. The UV curable coating composition of claim 2, wherein the content of at least one polyfunctional epoxy oligomer is 25 to 40 wt % with respect to the total weight of the UV curable coating composition, the content of the at least one epoxy compound is 10 to 25 wt % with respect to the total weight of the UV curable coating composition, the content of the at least one non-hydrolyzed epoxy silane is 20 to 30 wt % with respect to the total weight of the UV curable coating composition, the content of the at least one polyfunctional acrylic compound is 10 to 20 wt % with respect to the total weight of the UV curable coating composition, the content of the at least two photoinitiators is 0.1 to 10 wt % with respect to the total weight of the UV curable coating composition, and the content of the at least one surfactant is 0.1 to 5 wt % with respect to the total weight of the UV curable coating composition.

4. The UV curable coating composition of claim 1, wherein the at least one polyhydric alcohol has at least one structure of Chemical Formulas 1 to 3 below:

[Chemical Formula 1]

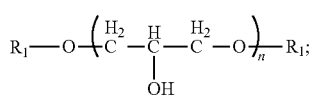

[Chemical Formula 2]

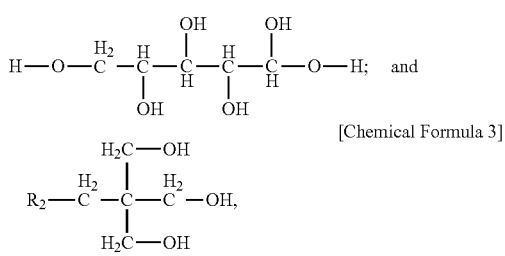

[Chemical Formula 3]

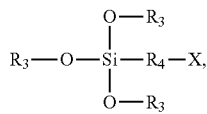

wherein $R_1$ is $C_3$-$C_8$ alkyl substituted with at least one hydroxyl, $R_2$ is hydroxyl or $C_1$-$C_5$ alkyl, and n is an integer of 1 to 4.

5. The UV curable coating composition of claim 1, wherein the at least one polyhydric alcohol is at least one alcohol selected from the group consisting of glycerin, diglycerin, polyglycerin, trimethylolpropane, sorbitol and pentaerythritol.

6. The UV curable coating composition of claim 1, wherein the at least one non-hydrolyzed epoxy silane has a structure represented by Chemical Formula 4 below:

[Chemical Formula 4]

$$R_3 - O - \underset{\underset{O-R_3}{|}}{\overset{\overset{O-R_3}{|}}{Si}} - R_4 - X,$$

wherein $R_3$ is $C_1$-$C_5$ alkyl, $R_4$ is $C_1$-$C_5$ alkylene or $C_1$-$C_5$ alkyleneoxy, and X is $C_2$-$C_8$ alkylene oxide or $C_3$-$C_8$ cycloalkylene oxide.

7. The UV curable coating composition of claim 1, wherein the at least one polyfunctional acrylic compound is at least one compound selected from the group consisting of 1,4-butanediol diacrylate, 1,6-hexanediol diacrylate, pentaerythritol triacrylate, dipentaerythritol hexaacrylate, and trimethylolpropane triacryate.

8. The UV curable coating composition of claim 1, wherein the at least two photoinitiators include at least one cationic photoinitiator and at least one free radical photoinitiator, respectively.

9. The UV curable coating composition of claim 8, wherein the at least one cationic photoinitiator is at least one photoinitiator selected from the group consisting of triarylsulfonium salts and diaryliodonium salts.

10. The UV curable coating composition of claim 8, wherein the at least one free radical photoinitiator is selected from the group consisting of chloromethylbenzophenone, ethyl benzoin ether, isopropyl benzoin ether, diethoxy acetophenone, α,α-dimethoxy-α-phenylacetophenone, (1-(4-(4-hydroxyethoxy)-phenyl-2-hydroxy-2-methyl-1-propane-1-one, 1-hydroxy-cyclohexyl phenyl ketone, and 2-hydroxy-2-methyl-1-phenyl-propan-1-one.

11. A substrate coated with the UV curable coating composition of claim 1.

12. The substrate of claim 11, wherein a material of the substrate is selected from the group consisting of polythiol urethane, polyacryl, polyamide, polyimide, polysulfone, polycarbonate, a polycarbonate-poly(ethylene terephthalate) copolymer, and polyaryl carbonate.

13. Lenses coated with the UV curable coating composition of claim 1.

* * * * *